(12) United States Patent
Hanks et al.

(10) Patent No.: US 9,647,786 B2
(45) Date of Patent: May 9, 2017

(54) DETERMINING BITLOADING PROFILES BASED ON SNR MEASUREMENTS

(71) Applicant: ARRIS Enterprises, Inc., Suwanee, GA (US)

(72) Inventors: William T. Hanks, Carol Stream, IL (US); Jeffrey J. Howe, West Chicago, IL (US); Ayham Al-Banna, Orland Park, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 273 days.

(21) Appl. No.: 14/142,246

(22) Filed: Dec. 27, 2013

(65) Prior Publication Data

US 2015/0188653 A1   Jul. 2, 2015

(51) Int. Cl.
*H04J 11/00*   (2006.01)
*H04L 27/00*   (2006.01)
(Continued)

(52) U.S. Cl.
CPC .......... *H04J 11/0023* (2013.01); *H04L 5/006* (2013.01); *H04L 5/0007* (2013.01);
(Continued)

(58) Field of Classification Search
CPC . H04L 27/0012; H04L 41/0893; H04L 43/04; H04L 43/10; H04L 5/0007;
(Continued)

(56) References Cited

U.S. PATENT DOCUMENTS 8,085,802 B1   12/2011 Monk et al.
9,025,954 B2 *  5/2015 Fang .................... H04L 12/2801
                                                                370/210
(Continued)

FOREIGN PATENT DOCUMENTS

EP   1564953 A2   8/2005
EP   1928113 A1   6/2008
(Continued)

OTHER PUBLICATIONS

PCT Invitation to Pay Additional Fees (Form ISA/206), RE: Application No. PCT/US2014/068810, dated Feb. 20, 2015.
(Continued)

*Primary Examiner* — Ian N Moore
*Assistant Examiner* — Mewale Ambaye
(74) *Attorney, Agent, or Firm* — Lori Anne D. Swanson

(57) ABSTRACT

With the introduction of orthogonal frequency division multiplexing (OFDM) technology in to communication channels in a cable network, cable modems that receive data downstream over subcarriers of the OFDM channel are grouped in to modulation tiers based on at least one metric. A profile is generated for each OFDM channel based on the measurements across cable modems and subcarriers related to the OFDM channel, including the metric values used to group the cable modems in to the modulation tiers. Included in an OFDM profile may be a scheme for allocating marginal cable modems in to the plurality of modulation tiers. The methods and systems for generating modulation and coding scheme profiles enable more efficient modulation by network elements.

18 Claims, 7 Drawing Sheets

(51) Int. Cl.
*H04L 12/24* (2006.01)
*H04L 12/26* (2006.01)
*H04L 5/00* (2006.01)

(52) U.S. Cl.
CPC .......... *H04L 5/0037* (2013.01); *H04L 5/0046* (2013.01); *H04L 27/0012* (2013.01); *H04L 41/0893* (2013.01); *H04L 43/04* (2013.01); *H04L 43/10* (2013.01)

(58) Field of Classification Search
CPC ..... H04L 5/0037; H04L 5/0046; H04L 5/006; H04L 27/0015; H04J 11/0023
See application file for complete search history.

(56) References Cited

U.S. PATENT DOCUMENTS

| | | | |
|---|---|---|---|
| 2003/0149991 A1* | 8/2003 | Reidhead | H04L 1/24 725/119 |
| 2005/0232156 A1* | 10/2005 | Kim | H04L 1/0029 370/236 |
| 2006/0056451 A1 | 3/2006 | Yano et al. | |
| 2007/0081551 A1* | 4/2007 | Oishi | H04B 3/54 370/463 |
| 2009/0239560 A1 | 9/2009 | Nakamura | |
| 2010/0157824 A1* | 6/2010 | Thompson | H04L 12/2697 370/252 |
| 2013/0236177 A1 | 9/2013 | Fang et al. | |
| 2013/0294489 A1 | 11/2013 | Thibeault et al. | |
| 2013/0322882 A1 | 12/2013 | Fang et al. | |

FOREIGN PATENT DOCUMENTS

| | | |
|---|---|---|
| WO | 2008005507 A2 | 1/2008 |
| WO | 2014152056 A1 | 9/2014 |

OTHER PUBLICATIONS

PCT Search Report & Written Opinion, RE: Application No. PCT/US2014/068810, dated May 12, 2015.

Official Action, RE: U.S. Appl. No. 14/142,256, dated Dec. 16, 2015.

PCT International Search Report for PCT/US14/068792, mailed on Feb. 27, 2015.

\* cited by examiner

| MD: 1; (OFDM) DCID: 3 | SUBCARRIER GROUP ID REPORTED DOWNSTREAM MER | | | | | | | |
|---|---|---|---|---|---|---|---|---|
| CM_ID | 0 | 1 | 2 | 3 | 4 | 5 | ... | 3839 |
| A | 32 | 33 | 33 | 34 | 33 | 31 | ... | 29 |
| B | 33 | 33 | 33 | 35 | 32 | 32 | ... | 32 |
| C | 27 | 28 | 28 | 30 | 29 | 30 | ... | 27 |
| D | 39 | 39 | 34 | 35 | 36 | 35 | ... | 38 |
| E | 32 | 33 | 33 | 35 | 32 | 31 | ... | 29 |
| F | 32 | 35 | 32 | 31 | 31 | 31 | ... | 23 |
| G | 28 | 31 | 30 | 29 | 28 | 30 | ... | 26 |
| H | 24 | 23 | 25 | 23 | 22 | 24 | ... | 27 |
| ... | ... | ... | ... | ... | ... | ... | ... | ... |

*FIG. 2*

| MD: 1;<br>DS CHANNEL ID: 1 | SUBCARRIER GROUP ID<br>QAM MODULATION LEVEL | | | | | |
|---|---|---|---|---|---|---|
| TIER | 0 | 1 | 2 | 3 | ... | 3839 |
| HIGH | 4096 | 1024 | 256 | 1024 | ... | 4096 |
| MEDIUM | 1024 | 512 | 256 | 512 | ... | 1024 |
| LOW | 512 | 512 | 256 | 512 | ... | 512 |
| BASE | 256 | 64 | 64 | 64 | ... | 256 |

FIG. 4

| MD: 1; (OFDM) DCID: 3 | | SUBCARRIER GROUP ID REPORTED DOWNSTREAM MER | | | | | | | AVERAGE MER |
|---|---|---|---|---|---|---|---|---|---|
| MD_CM_SG | CM_ID | 0 | 1 | 2 | 3 | 4 | 5 | ... | |
| 1 | A | 32 | 33 | 33 | 34 | 33 | 31 | ... | 29 |
| 1 | B | 33 | 33 | 33 | 35 | 32 | 32 | ... | 32 |
| 1 | C | 27 | 28 | 28 | 30 | 29 | 30 | ... | 27 |
| 1 | D | 39 | 39 | 34 | 35 | 36 | 35 | ... | 38 |
| 2 | E | 32 | 33 | 33 | 35 | 32 | 31 | ... | 25 |
| 2 | F | 32 | 35 | 32 | 31 | 31 | 31 | ... | 23 |
| 2 | G | 28 | 31 | 30 | 29 | 28 | 30 | ... | 26 |
| 2 | H | 24 | 23 | 25 | 23 | 22 | 24 | ... | 27 |
| ... | ... | ... | ... | ... | ... | ... | ... | ... | ... |

*FIG. 6*

DETERMINING BITLOADING PROFILES BASED ON SNR MEASUREMENTS

CROSS-REFERENCE TO RELATED APPLICATIONS

This application is a related to U.S. patent application Ser. No. 14/142,256 filed on Dec. 27, 2013 and entitled "Scheduler For High-Throughput System Having Multiple Profiles," which is incorporated herein by reference in its entirety.

BACKGROUND

An orthogonal frequency division multiplexing (OFDM) channel is composed of many subcarriers of a fixed bandwidth. Each subcarrier may use a different modulation. With the introduction of OFDM technology to communication channels in a cable network, it is desirable for cable modems receiving data downstream over a downstream communication channel to be informed of the modulation used by each of the subcarriers. An informed cable modem can use a particular modulation to receive downstream communications on the desired subcarrier in the spectrum of the OFDM channel.

Thus, techniques for informing a cable modem of the modulation used by subcarriers in an OFDM channel are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings:

FIG. 2 depicts example modulation error ratio (MER) survey data for a single data over cable service interface specification (DOCSIS) OFDM downstream channel;

FIG. 4 depicts an embodiment of using the survey data from FIG. 2 to group cable modems and create a number of profiles/tiers;

FIG. 6 illustrates an internal depiction of what reported modulation error ratio (MER) measurements may look like organized in a configuration/status table;

Figure 1:
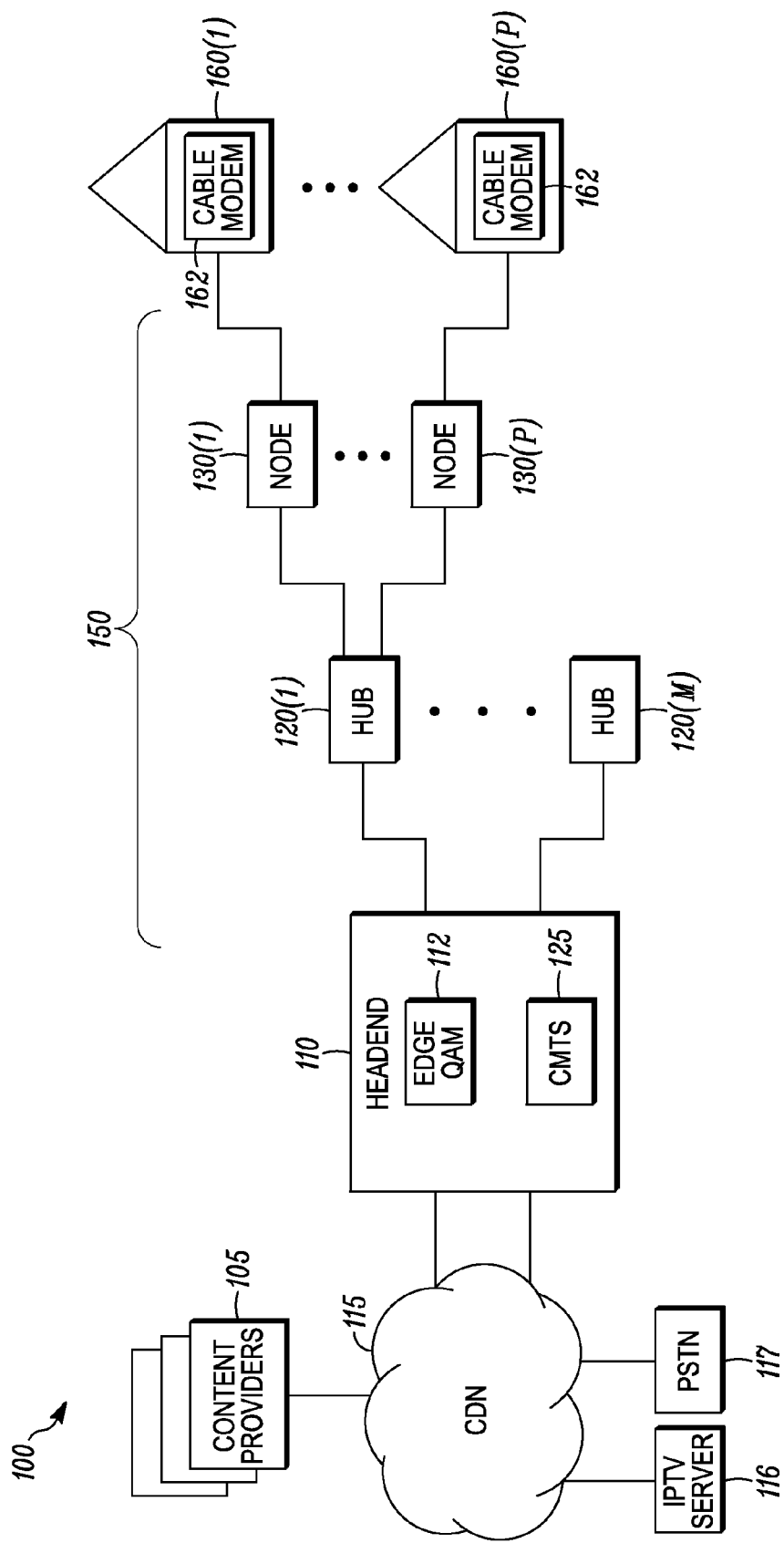
FIG. 1 illustrates an example cable television system that may implement orthogonal frequency division multiplexing (OFDM) techniques.

It is noted that while the accompanying FIGs. serve to illustrate embodiments of concepts that include the claimed invention, and explain various principles and advantages of those embodiments, the claimed invention is not limited to the concepts displayed, as additional embodiments would be readily apparent to those of ordinary skill in the art having the benefit of the description herein such that a display of certain concepts are not necessary to understand such embodiments.

DETAILED DESCRIPTION

With the introduction of orthogonal frequency division multiplexing (OFDM) technology to communication channels in a cable network, it is desirable for network elements communicating over a channel to be informed of the modulation used by each of the subcarriers. Disclosed herein are techniques for determining OFDM modulation and coding scheme (MCS) profiles for identifying profile tiers available to the network elements communicating over OFDM. In particular, disclosed are techniques for creating a profile for each OFDM channel for grouping network elements based on features of the network elements and features of the tiers, e.g., the modulation settings of the subcarriers that make up the OFDM channel.

Throughout this disclosure, a profile, profile tiers, and modulation tiers are used interchangeably. The MCS profile is the overall profile relevant to an OFDM channel and is made up of the profile tiers, or modulation tiers, for the OFDM channel, each profile/modulation tier having a corresponding profile and/or modulation level with which the tier is associated. It should be understood that a modulation tier is a modulation level that corresponds to the profile, and therefore a modulation tier and a profile tier as referred to herein correspond to the profile that corresponds to the tier and the modulation level for that tier. Other manners other than a modulation level are contemplated for defining the profile tiers for an OFDM channel.

Orthogonal frequency division multiplexing (OFDM) is a manner of encoding digital data on multiple carrier frequencies, i.e., a plurality of subcarriers. The available bandwidth of an OFDM channel may be divided into many narrow bands for transmitting data on these bands in parallel, where the signals transmitted are mathematically orthogonal. Data is carried over the subcarriers by varying the phase or amplitude of each subcarrier (e.g., QPSK, 4-QAM, 16-QAM, 64-QAM, etc.).

An OFDM channel is composed of many subcarriers, where each subcarrier may use a different modulation. In embodiments, the modulation level on each subcarrier results from varying the complex numbers at a Fourier transform input, e.g., an inverse fast Fourier transform input in the transmitter. The outputs include samples of a modulated multiplexed signal. A low symbol rate makes affordable the use of a guard interval between symbols, making it possible to minimize or eliminate intersymbol interference (ISI), and utilize echoes and time-spreading (e.g., on analogue TV these may be visible as ghosting and blurring, respectively) to achieve a diversity gain, i.e., a signal-to-noise ratio (SNR) improvement. As described in more detail below, the subcarriers of the OFDM channel may be divided in to a plurality of modulation tiers, wherein each tier corresponds to a modulation level.

OFDM is a scheme that may be developed for wideband digital communication, whether wireless or over copper wires. OFDM may be used in applications such as digital television and audio broadcasting, Digital Subscriber Line (DSL) internet access, wireless networks, and 4G mobile communications. OFDM is useful for many solutions, including, by way of example but not limited to: asymmetric digital subscriber loop (ADSL) and very high speed digital subscriber line (VDSL) broadband access via plain old telephone service (POTS) or public switched telephone network (PSTN) copper wiring, digital video broadcasting-cable (DVB-C), e.g., DVB-C2, power line communication (PLC), International Telecommunications Union (ITU) Telecommunications Standardization Sector (ITU-T) implementations, e.g., ITU-T G.hn high speed local area networking, Multimedia over Coax Alliance (MOCA), and others.

FIG. 1 illustrates an example cable television system 100 that may implement OFDM and the techniques disclosed herein. The system 100 includes a headend facility (HEF) 110, a plurality of hubs 120(1)-120(m), and associated with each hub, a plurality of nodes 130(1)-130(n) and a plurality of customers 160(1)-160(p). The HEF 110 or hubs 120 may have a cable modem termination system (CMTS) (shown as CMTS 125 in the HEF 110 by way of example in FIG. 1). Each of the nodes 130 has one or more corresponding access points, and each of the customers 160 has one or more corresponding network elements 162, shown in FIG. 1 as a cable modem.

A single node 130 may be connected to hundreds of network elements. Described herein are techniques related to a cable modem network element 162; however it should be understood that the cable modem is used by way of example as the concepts apply to other network elements. Examples of network elements include cable modems (as shown in FIG. 1), set top boxes, televisions equipped with set top boxes, data over cable service interface specification (DOCSIS) terminal devices, media terminal adapters (MTA), and the like. Thus, where reference is made to a cable modem, the concepts also apply more broadly to a network element.

A cable television system 100 provides one or more of commercial TV services, Internet data services, and voice services, e.g., Voice-over-Internet Protocol (VoIP) to one or more customer locations 160 (i.e., end users) in a given geographic area. To provide these services, the HEF 110 in the example cable television system 100 in FIG. 1 is shown coupled via a content delivery network 115 to a plurality of content providers 105, an IPTV server 116, and a public switched telephone network (PSTN) 117.

The content delivery network 115 may be a cable data network such as an all-coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 115 comprises, for example, a packet-switched network that is capable of delivering IP packets or data elements from an IPTV Server 116 to clients 160(1)-160(p), using, for example, a cable data network, PON, or the like. Examples of a content delivery network 115 include networks comprising, for example, managed origin and edge servers or edge cache/streaming servers.

The content delivery servers 115 deliver content via one or more wired and/or wireless telecommunication networks to users 160(1)-160(p). In an illustrative example, content delivery network 115 comprises communication links 150 connecting each distribution node and/or content delivery server to one or more client devices, e.g., for exchanging data with and delivering content downstream to the connected client devices 160(1)-160(p). The communication links may include, for example, a transmission medium such as an optical fiber, a coaxial cable, or other suitable transmission media or wireless telecommunications.

FIG. 1 illustrates a hybrid fiber-coaxial (HFC) cable network system 100. A typical HFC network uses optical fiber for communications between the headend and the nodes and coaxial cable for communications between the nodes and the end user network elements. Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. In this HFC network example embodiment, the nodes 130 communicate via optical fibers with the hubs 120 and via coaxial cable to customer premises 160.

The HEF 110 and/or the hubs 120 may be coupled to the IPTV server 116 and PSTN 117 via CDN 115, e.g., the Internet, for providing Internet and telephony services (e.g., to and from customer 160(1)-160(p)) via the CMTS. The CMTS 125, in an embodiment, is a general-purpose computing device or application-specific integrated circuit (ASIC) that converts downstream digital data to a modulated RF signal, which is carried over the fiber and coaxial lines in the HFC network 150 to one or more customer locations 160. A communication interface may connect the CMTS 125 to the content delivery network 115 for routing traffic between the HFC network 150 and the internet network, the IP network 115, a PSTN, and/or the content providers 105. The various content providers, 105 for example, may be the source of media content (e.g., movies, television channels, etc.).

It should be noted that there are multiple embodiments of a CMTS architecture, such as a CMTS with an integrated physical (PHY) layer, a CMTS with a distributed PHY, or a Converged Cable Access Platform (CCAP) architecture in which the QAM is placed in an edge QAM. In FIG. 1, the edge QAM 112 is shown in the headend, but the edge QAM 112 may be located downstream from the CMTS 125. The CMTS 125 may host downstream and upstream ports and may use separate F connectors for downstream and for upstream communication for flexibility. In embodiments, a communication interface utilizing downstream channels 1-4 connects the CMTS 125 to a portion of the HFC network 150 for communicating over the HFC network 150.

By way of example, embodiments below describe a cable modem network element at the customer's premises for receipt of the modulated signals from the HEF and/or CMTS. A cable modem is a type of network bridge and modem that provides bi-directional data communication via radio frequency channels on a cable television network, such as a hybrid fiber-coaxial plant (HFC) or RFoG infrastructure. For example, a cable modem can be added to or integrated with a set-top box that provides a TV set with channels for Internet access. Cable modems may deliver broadband Internet access in the form of cable Internet, taking advantage of the high bandwidth of an HFC or RFoG network. Cable modems can also deliver video services using Internet Protocol (IP). For example, the cable modem 162 may be connected to IPTV receivers or other items of CPE. A customer PC or laptop as well as other associated devices such as tablets, smartphones or home routers are termed customer premises equipment (CPE).

The network element, e.g., cable modem, 162 is connected through the network 150 to the CMTS 125. The cable modem converts signals received from the CMTS 125 carried over fiber and/or coaxial lines in the network. Cable modems 162 convert the digital data to a modulated RF signal for upstream transmission and convert downstream RF signal to digital form. Thus, the conversion is done at a subscriber's facility. The cable modem 162 demodulates the downstream RF signal and feeds the digital data to a CPE or an IPTV, for example. On the return path, digital data is fed to the cable modem (from an associated PC in the CPE, for example), which converts it to a modulated RF signal. Once the CMTS 125 receives the upstream RF signal, it demodulates it and transmits the digital data to its eventual destination. Cable modems 162 are therefore useful in transforming the cable system into a provider of video, voice and data telecommunications services to users.

The cable television network 100 may implement the disclosed OFDM techniques. In embodiments, the network 100 complies with the Data Over Cable Service Interface Specification (DOCSIS)® protocol. DOCSIS is an international telecommunications standard that permits the addition of high speed data transfer to an existing cable television (CATV) network, such as cable television network 100. The DOCSIS protocol is the protocol used to send digital video and data between a hub 120 or headend facility 110 and cable modem 162. DOCSIS is used to convey Internet or other packet-based networking information, as well as packetized digital video between CMTSs 125 and cable modems (CMs) 162. DOCSIS is employed by many cable television operators to provide Internet access over their existing network infrastructures, e.g., a hybrid fiber-coaxial (HFC) infrastructure, PON architectures, etc. While embodiments are disclosed with reference to DOCSIS, the OFDM implementations may apply to other networks or systems. For example, the disclosed techniques may apply to other systems that use OFDM-based profiles.

A typical DOCSIS architecture includes a cable modem (CM) 162 located at the customer premises 160, and a cable modem termination system (CMTS) 125 located at the CATV headend 110, as in the example cable television network 100 depicted in FIG. 1. In an embodiment, a memory in the headend 110, such a memory of the CMTS 125 or edge device 112, may include a DOCSIS program that implements the DOCSIS specification.

DOCSIS provides a variety of options available at Open Systems Interconnection (OSI) layers 1 and 2, the physical layer, and the data link layer. A DOCSIS physical layer may include the basic networking hardware transmission technologies of a network. A DOCSIS physical layer defines the means of transmitting raw bits rather than logical data elements over a physical link connecting network nodes. The bit stream may be grouped into code words or symbols and converted to a physical signal that is transmitted over a hardware transmission medium. The modulation schemes available for use and similar low-level parameters are defined by the DOCSIS scheme.

The evolving DOCSIS 3.1 platform employs orthogonal frequency division multiplexing (OFDM) subcarriers for RF transmission, where the frequency-division multiplexing (FDM) scheme is used as a multi-carrier modulation method using multiple subcarrier signals that are orthogonal to each other. For example, a large number of closely space orthogonal subcarriers may be used to carry data on several parallel data streams or channels. Using orthogonal subcarriers minimizes or eliminates cross-talk between the subchannels and inter-guard bands are not required i.e., the separate filter for each sub-channel is not required as it is in frequency division multiplexing (FDM).

In DOCSIS implementations, the OFDM scheme may replace the DOCSIS physical layer. Thus, in DOCSIS 3.1 the physical layer (PHY) may change from previous versions of DOCSIS to be a new form based on OFDM technology, both in upstream and downstream. The multi-carrier orthogonal frequency-division multiplexing (OFDM) channels can coexist anywhere in the downstream spectrum with legacy single-carrier quadrature amplitude modulation (QAM) channels. In evolving DOCSIS implementations, the subcarriers may be smaller than the previous 6 MHz and 8 MHz wide channel spacing, e.g., DOCSIS 3.1 may use 20 kHz to 50 KHz OFDM subcarriers. A single OFDM channel may be composed of many subcarriers of a fixed bandwidth. In an example DOCSIS 3.1 implementation, the OFDM subcarriers are bonded inside a block spectrum that may be up to 192 MHz wide.

The use of OFDM as a PHY technology in the downstream direction enables specifying modulation profile parameters at the subcarrier level. Thus, instead of a single modulation setting for the entire OFDM channel, each subcarrier in the OFDM channel may have a different modulation setting. The modulation level (i.e., number of points in the QAM constellation) of each subcarrier may vary depending on the transmission quality of the medium. For example, at a first frequency the subcarrier may use very high modulation to pass data. But, another frequency above or below the first frequency may have an impediment, and a lower modulation setting may be desirable. Consider an HFC cable plant with a frequency characteristic referred to as rolloff, where the transmission amplitude starts to tail off due to the physical characteristics of the equipment within the cable plant. When the transmission amplitude degrades enough, the subcarriers in that region may advantageously use a lower level of modulation so that the receiving cable modems can properly demodulate those subcarriers.

The different modulation options for subcarriers of an OFDM channel allow flexibility by offering a range of options to compensate for a spectrum that has interference or fidelity loss due to impediments (e.g., interferers, intrinsic properties of taps/cable, etc.). The subcarrier modulation scheme is called variable bit loading, which results in an OFDM modulation profile whose parameters are variable over each subcarrier frequency. For example, each OFDM subcarrier may be modulated with a modulation scheme, such as quadrature amplitude modulation (QAM) or phase-shift keying, to maintain a total data rate similar to single-carrier modulation schemes in the same bandwidth. The modulation profile with parameters that are variable over subcarrier frequencies is referred to as the modulation and coding scheme (MCS) profile.

A measure of the transmitted or received signal quality of a modulated signal quantifies a performance of the transmitter or receiver. Ideally, the modulated signal sent by a transmitter or received by a receiver would have all constellation points precisely at ideal locations. However, various imperfections in the implementation or signal path, e.g., noise, low image rejection ratio, phase noise, carrier suppression, distortion, etc.) can cause the actual constellation points to deviate from the ideal locations. For example, the downstream (DS) Signal-to-Noise Ratio (SNR) measurement at the radio frequency (RF) input of any cable modem in cable networks varies over frequency due to reasons such as the noise and the frequency response of the plant components (cables, taps, amplifiers, etc.) between the CMTS and the cable modem. In embodiments, the energy of decoded symbols divided by the energy of the modulation is referred to as a modulation error ratio (MER), which is a good estimate for the SNR, e.g., when the values are large.

In the case of an OFDM channel with subcarriers that may employ varying modulation techniques, it is desirable to select the subcarrier for transmission to a cable modem that offers the best performance under the circumstances (e.g., for the particular subcarrier/cable modem relationship). If, on the other hand, a single setting, e.g., a high order modulation, were defined across all subcarriers, many cable modems would have decreased data rates if their receivers did not have SNR or MER values that enables them to demodulate all of the tones at the single setting, e.g., a high order modulation. Conversely, if a low order modulation were defined for all subcarriers, all cable modems with a SNR or MER value that is higher than the selected threshold would waste capacity on the channel.

Collecting measurements for subcarriers may assist in assigning modulation tiers to the cable modems communicating over the OFDM channel. In embodiments, network elements communicating over a channel, e.g., receiving data downstream over a downstream communication channel, are informed of the modulation used by each of the subcarriers in order to sample information on each subcarrier. For example, a cable modem may sample information on each one of the subcarriers of the OFDM channel. The SNR value at the RF input of a cable modem is estimated by the cable modem by decoding the received symbols and calculating the modulation error. The cable modem can report the measurements, such as back to the headend or CMTS. The CMTS can use the information to assign a MCS profile tier to the cable modem.

However, if each cable modem is to be assigned its own unique MCS profile or profile tier depending on the cable modem's reported measurements across all subcarriers, it is burdensome to the cable operator to determine and then provision an ordered list of modulations for subcarriers for each cable modem. For example, using the downstream as an example, the CMTS 125 would need to inform each of the cable modems 162 what modulation is used for each one of the subcarriers used in the spectrum of an OFDM channel in the downstream direction, collect the reported measurements, and then map the cable modems to a profile tier.

FIG. 2 depicts an example of survey data from each of the cable modems in a cable modem population available to communicate over an OFDM channel. In this scenario, assume that the OFDM channel is as large as 192 MHz wide. If subcarrier channels are each 25 KHz, choosing an equal width for each subcarrier (for purposes of illustration) results in the 192 MHz OFDM channel divided in to 3840 subcarriers. Each cable modem, identified in column 202 as CM_ID (e.g., A, B, C . . . ) reports a downstream MER over each subcarrier identified in column 206 as Subcarrier Group ID (e.g., 0, 1, 2 . . . 3839). Thus, in the subcarrier group of 3840 subcarriers that make up the OFDM channel, 3840 measurements are reported for each cable modem.

On each one of these 3840 subcarriers illustrated in FIG. 2, the network 100 uses the calculated and reported MER to determine how well the CM 162 receives the signal from the CMTS 125 over each of the subcarriers. To assign a modulation profile to each cable modem, the CMTS determines the modulation that should be used for each of the subcarriers based on the reported measurements from the cable modem, i.e., raw data. Thus, for each cable modem CM_ID, 3840 MERs are required to be reported to allow an analysis of the 192 MHz wide OFDM channel. Further, in this scenario, the CMTS would need to determine and then provision an MCS profile for each cable modem based on each cable modem's reported 3840 MER levels over each subcarrier.

Introducing a limited number of MCS profile tiers that can be used across a plurality of cable modems can reduce the number of individual MCS profiles that need to be assigned. The DOCSIS 3.1 protocol proposes to generate tiers. As disclosed herein, modulation tiers may be defined for each modulation tier defined by a group of subcarriers, and each tier corresponding to a respective modulation technique (e.g., QPSK, 16-QAM, etc.). The tiers of modulation levels assigned across all of the subcarriers within an OFDM channel make up the OFDM channel MCS profile.

In embodiments, the CMTS assists the multi-system operator (MSO), e.g., cable operator, in creating the modulation tiers that define the OFDM channel profile based on measurements returned from the cable modem. The DOCSIS protocol, in an example implementation, indicates that the MCS profiles are to be provided to the cable modems to determine which modulation tier each cable modem can use. The cable operator may publish modulation tiers available for each subcarrier as profiles for OFDM channels. The cable modem can notify to the CMTS which profiles and/or profile tiers it can use.

The tiers in an OFDM channel profile may be initially defined to correspond to the modulation QAM order and forward error correction (FEC) rate applied to the subcarriers. For example, in the OFDM channel profile, each subcarrier in a plurality of subcarriers is assigned a modulation, and a coding part that refers to a forward error correction selection. Each subcarrier's assigned modulation order may change from a lowest binary shift phase keying to a higher order quadrature amplitude modulation, e.g., 16QAM.

However, while DOCSIS introduces a concept of generating tiers, the DOCSIS protocol does not define a manner by which the MCS profiles are created or allocated to the network elements. The DOCSIS 3.1 protocol proposal to generate profiles does not specify or define how to convert the raw data from the cable modems, such as that shown in FIG. 2, in to the OFDM channel profiles or modulation tiers within the OFDM channel profile. While default profile tiers may be defined upon system initialization, more optimal definitions for generating or modifying the plurality of modulation tiers are disclosed herein.

As disclosed herein, modulation tiers may be identified by defining a distribution scheme used to identify subsets of the CM population that are to be grouped in to each of the MCS profile tiers, wherein the profile may further include a predetermined scheme for distributing the cable modems and/or a predetermined scheme for handling marginal CMs, e.g., moving marginal CMs or adjusting the MCS profiles. The disclosed techniques may assist a cable operator to create the profile tiers, e.g., modulation tiers, for a DOCSIS OFDM channel. Each profile tier is to have a measurable difference from another profile tier and may serve a measurable number of cable modems.

Figure 3:
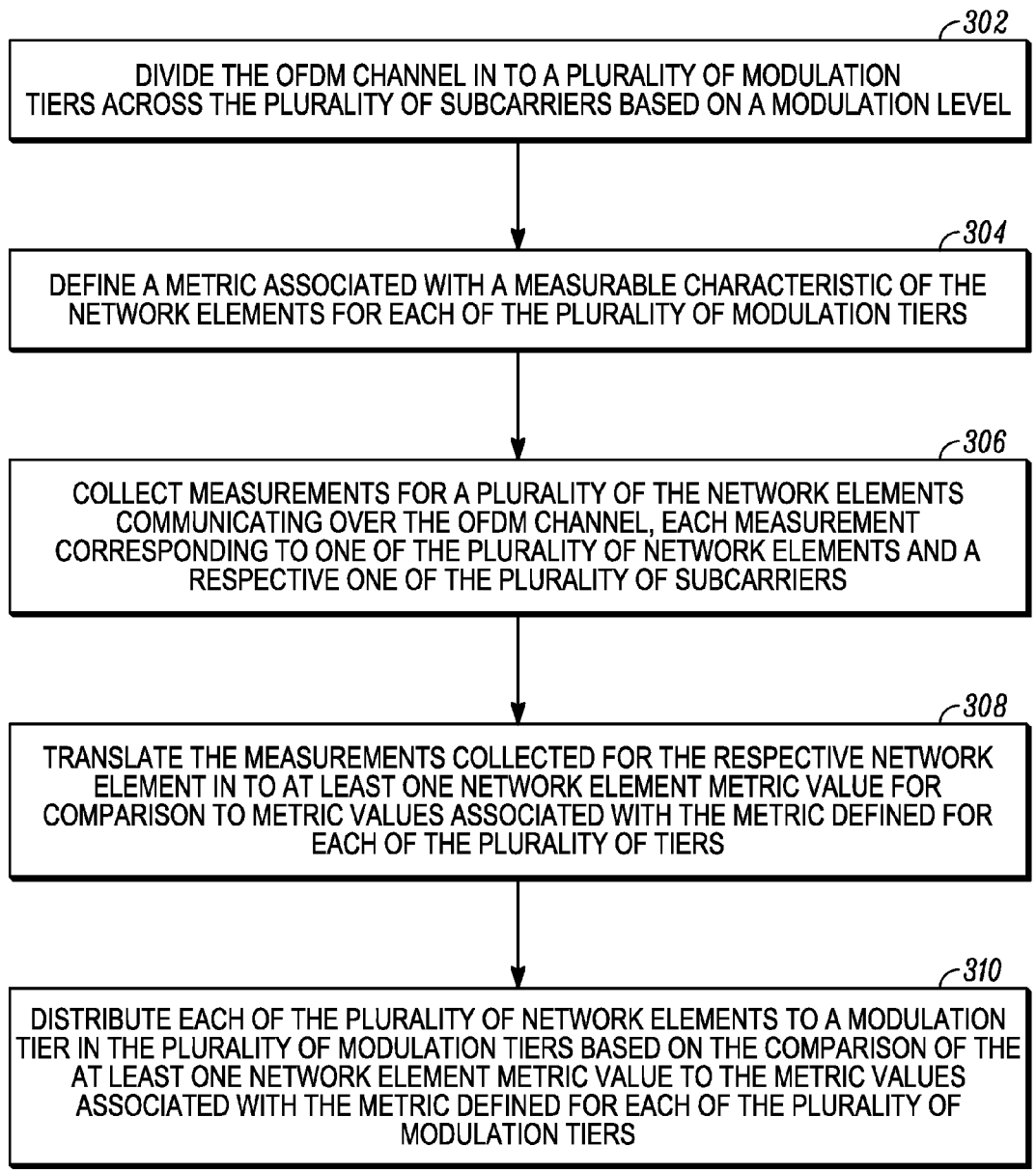
FIG. 3 depicts a high level flow diagram for grouping network elements based on a profile of an orthogonal divisional multiplexed (OFDM) channel having a plurality of subcarriers.

FIG. 3 depicts a high level flow diagram for generating a profile of modulation tiers, also referred to herein as modulation tiers, for an orthogonal divisional multiplexed (OFDM) channel having a plurality of subcarriers. Network elements may be grouped to define the tiers or the network elements may be grouped based on the profile tiers. As described below, FIG. 3 illustrates a technique for creating modulation tiers based on features of the network elements and features of the tiers, e.g., the modulation settings of the subcarriers that make up the OFDM channel. FIG. 3 also illustrates techniques for generating the OFDM modulation tiers based on a metric and using the raw data to identify metric values corresponding to each of the plurality of modulation tiers.

At 302, the OFDM channel space is partitioned in to different profile tiers. As described in more detail below, a plurality of modulation tiers may be identified for the OFDM channel across the plurality of subcarriers based on a modulation level. As also described in more detail below, the tiers and modulation values for each of those tiers make up part of the profile of the OFDM channel. The division in to modulation levels may be done by the CMTS or another device behind it for the purpose of creating a number of modulation tiers.

FIG. 4 depicts an embodiment for how an OFDM channel is divided in to a plurality of modulation tiers. The tiers shown by way of example are a base profile tier 402, which has low modulations, a low profile tier 404, a medium profile tier 406, and a high profile tier 408. In this example, the QAM modulation levels are defined for each subcarrier in each tier, e.g., for subcarrier 0, 256, 512, 1024, and 4096 QAM modulation levels correspond to the base tier, low tier, medium, and high tier, respectively. In an example, the goal is to place each of the CM_IDs from FIG. 2 in to at least one of tiers 402, 404, 406, or 408 in column 410 in FIG. 4 across all subcarriers based on the modulation settings in columns 412 for the respective cable modem.

It should be understood that the quadrature levels of each tier may vary from that shown in FIG. 4. For example, for subcarrier 0, tier one may be defined as 256-QAM, tier two may be defined as 1K-QAM, tier three may be defined as 2K-QAM, and tier four may be defined as 4K-QAM. Further, it should be understood that using more or fewer tiers may be more appropriate depending on the circumstances, e.g., if a subcarrier muting is different. For purposes of example, an HFC plant with at least an 8 dB variation in CNR is contemplated, where one profile may be used for each 3 dB change, i.e., four tiers. Thus, the modulation levels for each of the four tiers in FIG. 4 is provided as an example, but it should be understood that tiers may be divided differently by assigning different modulation levels to each tier, and a different number of tiers may be defined for more/less granularity. Multiple approaches are contemplated for generating the OFDM modulation profiles from the raw data.

At 304, a metric associated with a measurable characteristic of the network elements for each of the plurality of modulation tiers is defined for each of the plurality of modulation tiers. The metric may be based on a characteristic or feature of the cable modems relating to subcarriers in the OFDM channel, such as a calculation related to the cable modem MER values, SNR subcarrier values, etc. The measurable characteristic of the network elements may be a characteristic of at least one of a cable modem, a cable modem termination system (CMTS), or the OFDM channel. The measurable characteristic of the network elements may include measurements such as a modulation error rate, a signal-to-noise ratio, a packet error rate, a bit error rate, or a number of cable modems, for example. The metric defined at 304 may be defined similarly for the OFDM channel (all tiers) or defined individually for each of the plurality of tiers.

The metric values associated with the metric defined for each of the plurality of modulation tiers includes at least one of a range of values, values calculated from the measurements for the plurality of network elements, user-defined values, reported values from the network element, cable operator-defined values, statistical approach values, a total number of cable modems divided by the number of tiers, or a percentage of the total number of cable modems, or the like.

In embodiments, a measurable characteristic is related to measurements calculated for each of the plurality of network elements based on downstream or upstream parameters by headend equipment that characterizes digitally modulated signals returned from the plurality of network elements. Test equipment by a cable operator may be used to characterize digitally modulated signals to measure downstream/upstream parameters, including the modulation error ration (MER). For example, a headend may characterize digitally modulated signals returned from a network element by measuring an initial total power loading which is equal to total power of RF energy present within a bandwidth of interest on an OFDM channel, instructing a cable modem to transmit a first test signal on the OFDM channel at initial total power loading, monitoring the first test signal at a headend of the OFDM channel, and measuring at the headend at least one of a modulation error ratio (MER0), signal-to-noise ratio (SNR0), packet error rate (PER0), or bit error rate (BER0).

In embodiments, a measurable characteristic is related to a derivative of measurements that the CMTS calculates or solicits from a cable modem regarding how the CM receives a particular test signal (e.g., pilots and training tones that the CM receives). A CMTS can report a variety of operating parameters to the end user. For example, CMTS burst receivers can provide an upstream signal-to-noise ratio (SNR) estimate. An SNR is a general measurement of the ratio of signal power to noise power. The upstream SNR is an operating parameter provided by the upstream receiver used in a CMTS. The downstream SNR may be provided by the QAM receiver in the cable modem or set top box. Because of the time-shared nature of the upstream, many of today's CMTSs measure parameters on a per-channel or per-cable modem basis.

In embodiments, a measurable characteristic is related to measurements received from the plurality of network elements calculated by each of the plurality of network elements. The downstream parameters reflect conditions at the customer premises, in contrast to the upstream parameters from the CMTS. For example, the network element may perform various measurements and report the results back to the CMTS (or some device behind CMTS). Network elements at the customer premises, including cable modems and digital set top boxes, can provide digitally modulated signal operating parameters such as RF signal level and SNR. The quality of a measurement of a digitally modulated RF signal or the SNR estimate of a demodulated digital signal is also referred to as the modulation error ratio (MER). Thus, an MER measurement is closely related to an SNR measurement and often the terms are used interchangeably.

By way of example, assume that the modulation error rate (MER) is the measurable characteristic of the network elements defining the metric. The MER is the ratio of average signal constellation power to average constellation error power. A signal sent by an ideal transmitter or received by a receiver would have all constellation points precisely at the ideal locations despite imperfections in the implementations (e.g., noise, carrier suppression, distortion, etc.). The MER may include the effects of the cable network downstream or upstream noise floor, in-channel frequency response (including amplitude tilt and ripple, group delay variation, and micro-reflections), oscillator phase noise, receiver imperfections, and all other impairments that affect the receive symbol constellation. Thus, a modulation error ratio (MER) measurement quantifies the performance of a digital radio transmitter or receiver in a communications system using digital modulation (e.g., QAM).

At 306, measurements for a plurality of the network elements, such as those described above, are collected. Collecting measurements for a plurality of network elements communicating over the OFDM channel may include a collection of the cable modem's reported measurements received back at the CMTS 125. In embodiments, surveying the network element population is performed to collect the network element's measurements per subcarrier. FIG. 2 depicts example survey data provided for a DOCSIS 3.1 Standard-Possible Sample MER Survey for a single DOCSIS 3.1 OFDM Downstream Channel. As shown by the MER measurements collected in FIG. 2, each measurement corresponds to one of the plurality of network elements and a respective one of the plurality of subcarriers in the subcarrier group that makes up the OFDM channel. In this example, the MER for a cable modem may be returned in the survey as a network element metric that identifies the quality of reception of a transmitted signal from the CMTS to the CM, i.e., how well the CM receives that signal.

At 308, to determine how to distribute the cable modems to each of the tiers, the measurements collected at 306 are translated for the respective network element in to at least one network element metric value for comparison to metric values associated with the metric defined for each of the plurality of tiers.

Figure 5:
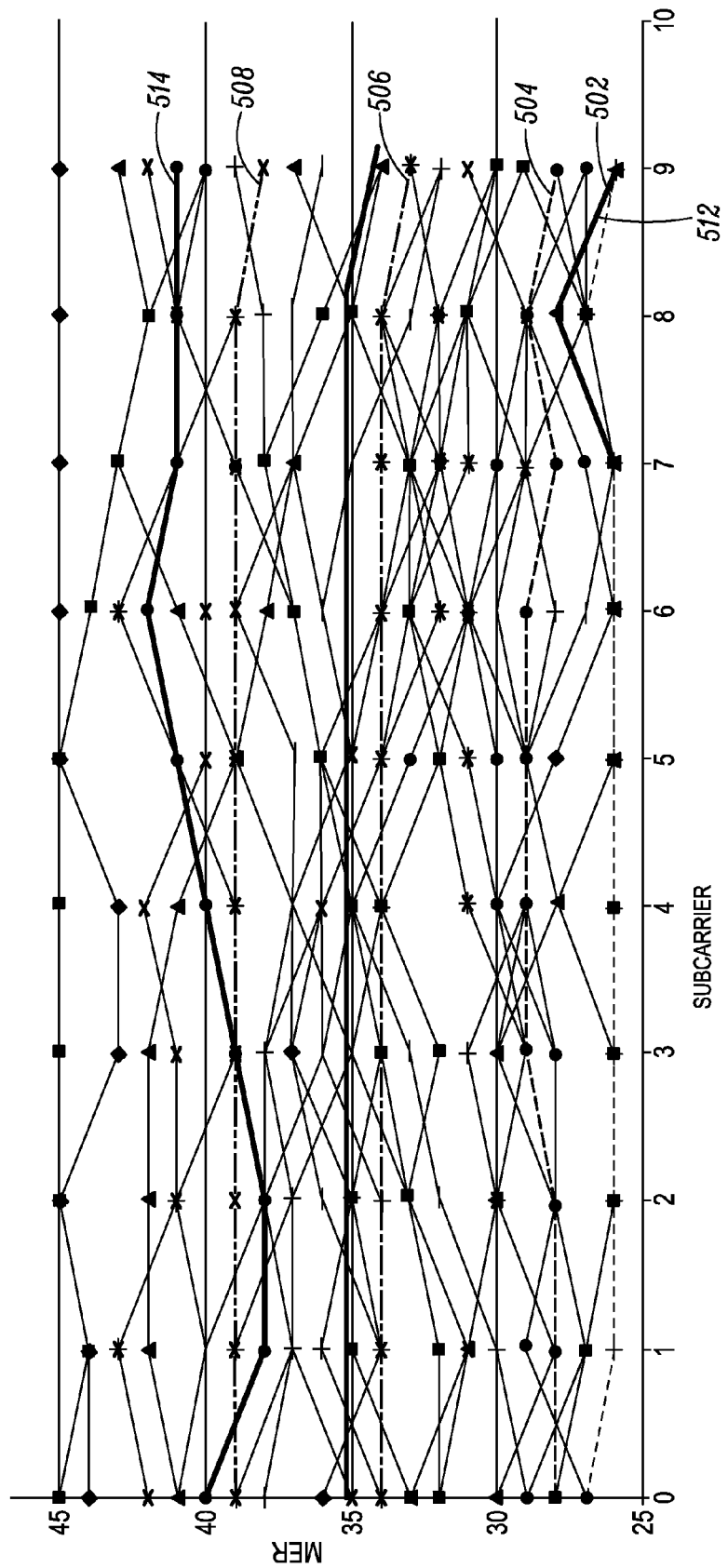
FIG. 5 illustrates an example mapping of cable modems with respect to threshold values for each tier.

FIG. 5 illustrates an example of cable modem MER measurements collected across an OFDM channel, where the MER is the metric associated with the measurable characteristic of the network elements for each of the plurality of modulation tiers. The MER values are represented on the y-axis and ten example subcarriers in the subcarrier group for the channel (numbered 0-9 on the x-axis) represent a subset of subcarriers in an OFDM channel. FIG. 5 maps the MER readings collected across the ten example subcarriers 0-9 for a population of cable modems. Each cable modem's reading is represented by a solid lines connected between respective identifying shapes across the plurality of subcarriers. Each solid line in FIG. 5 represents a carrier modem's MER values (y-axis) as identified and collected at 306 for each subcarrier (x-axis), where a subset of 10 subcarriers and a small number of cable modems are depicted for illustration.

In FIG. 5, the MER metric values defined for each tier are shown for each subcarrier connected by a line to represent a boundary line for each tier. Demarcation lines 502, 504, 506, and 508 (dotted lines) are defined by taking the total space of MER values and dividing them in to 4 different tiers. Lines 502, 504, 506, and 508 represent the boundaries between profiles thereby defining the profile tiers or modulation tiers. Each demarcation line represents the threshold values for the subcarriers for the respective profile tier. The dotted lines denote the threshold metric MER values individually for each subcarrier. For example, Line 508 represents the high-tier MCS profile threshold, Line 506 represents the medium-tier MCS profile threshold, line 504 represents the low-tier MCS profile threshold, and line 502 represents the base-tier MCS profile threshold. In this example, four tiers are contemplated, base 502, low 504, medium 506, and high 508.

FIG. 5 illustrates an example comparison of the plurality of network element measurements across the subcarriers (solid lines) to MER metric values across the subcarriers (dotted lines) for each of the plurality of profile tiers of the OFDM channel. The cable modems are shown mapped against the threshold MER values for each subcarrier in each tier for a comparison of the network element MER values for each subcarrier to the threshold values defined for subcarrier in each tier. Mapping the cable modem MER values across the subcarriers against demarcation liens representing a threshold metric MER value across subcarriers assists in illustrating how the cable modem population compares to the high, medium, low and base MCS profile tier groups.

At 310, each of the plurality of network elements may be distributed to a modulation tier in the plurality of modulation tiers. The distribution of network elements may be based on the comparison of the at least one network element metric value to the metric values associated with the metric defined for each of the plurality of modulation tiers. The survey data including measurements across subcarriers returned from the cable modems, such as that illustrated in FIG. 2, may be translated in to the tiered profiles for assigning the cable modems in to one of the four profile tiers.

In embodiments, the CMTS organizes measurements reported from the cable modem for each of the subcarriers, and sorts the cable modems. The sorted list not only sorts the cable modems but may be divided to generate dividing lines that represent the profile tier boundaries. Thus, sorting MER values based on a similar characteristic or metric may be a technique for ordering the cable modems for separation in to groups corresponding to the modulation tiers. The distribution of network elements may be influenced by a predetermined scheme for distribution, as described in more detail below.

FIG. 6 illustrates an internal depiction of what reported MER measurements may look like organized in a configuration/status table, such that the raw survey results data, such as that shown in FIG. 2, is organized based on the metric used for sorting/tiering. The CM_ID (A, B, C, . . . ) in column 202 (see also FIG. 2) identifies the cable modems to be serviced over the OFDM channel. The reported downstream MER for each CM_ID for each of the subcarriers in the subcarrier group, identified as Subcarrier Group ID (0, 1, 2 . . . ), is shown in the columns 206 (also shown in FIG. 2).

In the example shown in FIG. 6, the metric defined for each of the plurality of modulation tiers is an average MER, calculated and shown in column 606. The average MER across subcarriers is calculated for each cable modem from the raw survey data returned from the cable modems and shown in FIG. 2. Thus, the MER measurements collected in column 206 for each subcarrier for each cable modem (CM_ID) is translated in to an average MER network element metric value, shown in column 606.

As shown in FIG. 6, a plurality of tiers are defined based on the average MER as the metric, shown are tiers 1 and 2. Each tier is represented by a range of metric values associated with the average MER metric. As shown, tier 1, represented by numeral 609, has an average MER metric value range of 28-38 and tier 2, represented by numeral 611, has an average MER metric value range of 23-27 (referring to column 606).

In FIG. 6, the cable modems in the cable modem population using this OFDM channel are sorted based on their average MER for distribution to the modulation tiers. Thus, based on the cable modem's average MER network element metric value, CM_IDs A, B, and D are distributed to tier 1 and CM_IDs E, F, G, and H are distributed to tier 2. It is noted that CM_ID=C has an average MER of 27 and is designated to tier 1, while CM_ID=H also has an average MER of 27 but is designated to tier 2. These modems are considered marginal cable modems and will be discussed in more detail below.

The above example describes a metric that is the average of a measurable characteristic (e.g., MER), wherein the metric values associated with the metric is represented as a range of values defined for each of the plurality of modulation tiers. In another embodiment, the average MER metric values for each tier may be identified by a threshold value for each of the plurality of tiers. For example, the threshold average MER metric value for tier 1 in the example shown in FIG. 6 would be 27, whereas the threshold average MER metric value for tier 2 would be 23. If a network element has an average MER that exceeds the tier 2 threshold average metric, but does not meet or exceed the threshold average MER metric value for tier 1 value, the network element is allocated to tier 2. Thus, the metric used to distribute the cable modems to the modulation tiers in this example is an average MER metric further defined for each of the plurality of tiers by a threshold of the average MER.

As demonstrated by the above examples, the metric may be defined in a number of different ways. In other example embodiments, the metric defined for each tier is a target of a measurable characteristic, a threshold of the measurable characteristic for each respective tier, an average of the measurable characteristic for a respective tier, a minimum of the measurable characteristic for a lowest tier, a maximum of the measurable characteristic for a highest tier, a statistical distribution of the measurable characteristic among the tiers, a percentage amount of the measurable characteristic for a respective tier, an equal distribution of the measurable characteristic for each tier, or the like.

In an example, the metric for grouping network elements may be the modulation error ratio (MER), but the MER metric may be further defined for each of the plurality of tiers as a minimum modulation error ratio value associated with each respective tier. Using just the MER data reported by the network elements for subcarriers 0-5 shown in FIG. 6 as examples, the minimum modulation errors reported for CM_ID=A is 31, CM_ID=B is 32, CM_ID=C is 27, CM_ID=D is 34, CM_ID=E is 31, CM_ID=F is 31, CM_ID=G is 28, and CM_ID=H is 22. For a tier defined by a minimum MER value of 31, CM_IDs A, E, and F would be grouped in to that tier.

The metric values associated with the minimum MER metric for each tier may be a cable-operator defined value or range of values. For example, if the cable operator defined tier 1 as a minimum MER metric range of 22-27, CM_IDs H and C would be grouped in to tier 1.

Figure 7A:
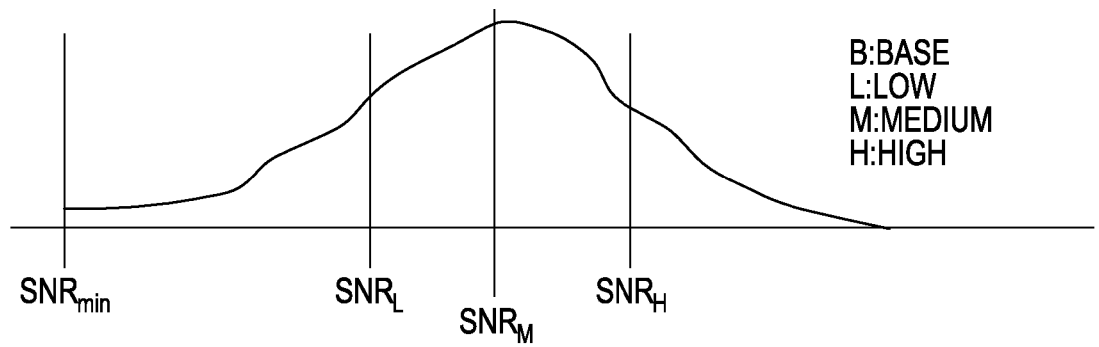
FIG. 7A depicts an example for separating subcarriers in an OFDM channel.

FIG. 7A depicts an example for separating subcarriers in an OFDM channel in to tiers based on a subcarrier SNR threshold explicitly defined for each of the different MCS profiles tiers. In an example, a histogram or probability distribution function (PDF) may be generated with the reported SNR or MER values for all the cable modems. As shown, the cable modems are sorted according to their reported MER value in this subcarrier group in accordance with a probability distribution function (PDF). In another example, the cable modems may be sorted/graphed according to MER values based on an ascending MER value order or a descending MER value order.

In FIG. 7A, the threshold values for each tier are explicitly defined in terms of the SNR value to separate the OFDM channel into tiers. For example, the cable operator may specify a SNR target threshold value for each tier ($SNR_{min}$, $SNR_L$, $SNR_M$, and $SNR_H$). The threshold values then dictate which cable modems fall within each tier based on the cable modem's reported MER values. In embodiments, the $SNR_{min}$ value may be defined to correspond to the minimum measured MER value for the entire OFDM channel.

In embodiments, one or more tiers are defined based on a standard deviation approach. For example, the minimum MER value ($MER_{min}$), an average MER value ($MER_{avg}$) and the standard deviation value for MER ($MER_{stdev}$) for each subcarrier group may be identified across a CM population. For the high tier, the modulation profile supports:

(1) $MER_{avg}+(\alpha*MER_{stdev})$; α is a positive number

For the medium tier, create a modulation profile that supports:

(2) $MER_{avg}$.

For the low tier, create a modulation profile that supports:

(3) $MER_{avg}-(\alpha*MER_{stdev})$; α is a positive number

For the base tier, the modulation profile supports MER-min across all subcarriers.

The standard deviation approach for a symmetric distribution of cable modems to modulation tiers may be optimal. Rather than identifying a threshold or a target percentage of CMs desired per tier, for example, the statistical approach groups modems in to tiers based on a particular measurement.

In another example, the minimum MER metric defined for each tier may be defined based on the MER measurements reported back from the cable modem, where each minimum value reported for a cable modem defines a tier. For example, based on the measurements reported in FIG. 6, the tiers may include tier 1 with a minimum MER metric value=22, tier 2 with a minimum MER metric value=27, tier 3 with a minimum MER metric value=28, tier 4 with a minimum MER metric value=31, tier 5 with a minimum MER metric value=32, and tier 6 with a minimum MER metric value=34. Thus, CM_IDs A, E, and F are grouped in to tier 4, for example, and CM_ID=C is grouped in to tier 2.

Consider embodiments in which the metric is a summed MER value. Thus, the MER values across subcarriers may be summed such that the summed MER value ($MER_{sum}$) for each cable modem is determined. For a plurality of modulation tiers each associated with a MERsum value or range of values, the network element MERsum metric value may be used to sort and then group the network elements in to each of the corresponding modulation tiers.

In embodiments, an MER minimum value ($MER_{min}$) may be the metric used for distribution. Thus for each subcarrier group across a network element population, the $MER_{min}$ value for each network element is calculated. The $MER_{min}$ value for each network element is compared to a $MER_{min}$ metric value defined for each of the plurality of tiers, and the network element is grouped in to the tier with the corresponding MERmin metric value. Similarly, in embodiments, an MER maximum value ($MER_{max}$) for each subcarrier group across a CM population may be the metric for sorting the network elements.

In embodiments, the system creates a modulation tier that supports the expected worse modem performance across all subcarriers. For example, a base modulation tier may be defined based on a $MER_{min}$ supported across all subcarriers. Similarly, for the highest MCS profile tier, a modulation profile may be created that supports the $MER_{max}$ across all subcarriers. The remaining tiers in the OFDM channel may be defined based on a different metric.

In embodiments, a target MER is the metric, where a modulation goal is identified ($MER_{target}$) and the plurality of modulation tiers are each defined based on a $MER_{target}$ metric value or range of values. Network elements may be grouped based on the target MER desired for the group of network elements. For example, for a particular modem population, a target MER may be determined based on an MER level desired for that modem population. Thus, the target MER, but not the actual reported MER, may dictate the grouping of cable modems in to tiers where each tier defines a respective target MER. The system may identify a group of network elements that most closely matches the target MER for grouping in to the corresponding tier as the network elements having an MER measurement greater than a $MER_{target}$ threshold metric value. In embodiments, the system identifies network elements that most closely match the target MER/modulation for a tier and designates the network elements based on a closest match technique.

As described herein, while cable modems may be grouped in to each of the tiers based on the underlying metric used to define each modulation tier, other techniques are considered for distributing network elements to each tier. These approaches may include manners for distributing the network elements to the tiers of an OFDM channel that supersedes or alters the distribution scheme under certain circumstances. For example, distributing each of the plurality of network elements to a modulation tier based on the comparison of measurement collected for the plurality of network elements to the metric values associated with the plurality of modulation tiers may be controlled or influenced by a predetermined scheme, such as CM count per tier, a target CM measurement per tier, a target modulation measurement per tier, a statistical measurement per tier, a SNR target approach (e.g., enhanced modulation profile based on SNR targets), or defined for each tier based on a standard deviation curve. In embodiments, the desired outcome of these predetermined schemes for distribution determined a priori.

In a cable modem (CM) count embodiments, a CM count method is used to generate OFDM modulation profiles and dictate how network elements should be distributed to each of the modulation tiers in a profile. For each tier, a number of cable modems may be identified as the tier metric value. The algorithm for the CM count method may be based on percentages, such as an even distribution of cable modems across the tiers. Thus, for example, where there are 4 tiers, the objective may be to put an equal number of CM (25% of the total) in each profile. The cable modems may be sorted based on a network element metric value and then, in order, separated in to four tiers, where each tier includes 25% of the cable modems. For example, if there are 100 cable modems, once the cable modems are sorted based on the decided metric value, the first 25 cable modems would be assigned to tier 1.

Figure 7B:
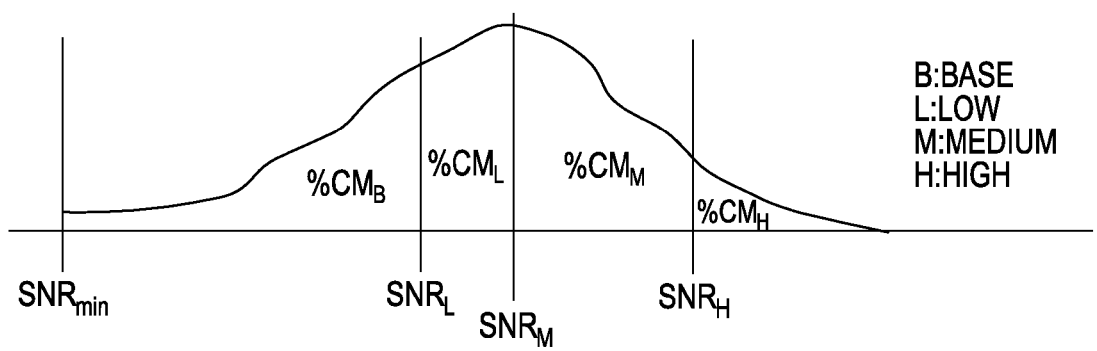
FIG. 7B depicts a PDF mapping of cable modems to tiers based on a cable modem percentage method.

FIG. 7B depicts a PDF mapping of cable modems to tiers based on a cable modem percentage method. In this example, the metric value defined for each MCS profile is a percentage of cable modems defined for each MCS profile tier. For example, the cable operator or a user may define the desired number/percentage of cable modems to be included in each MCS profile tier. Similar to FIG. 7A, the cable modems are shown in FIG. 7B sorted according to their reported MER value in this subcarrier group in accordance with a probability distribution function (PDF). In another example, the cable modems may be sorted/graphed by MER value based on an ascending MER value order or a descending MER value order. Depending on the sorting scheme (e.g., PDF, ascending order, descending order, etc.), the percentage of cable modems designated for each tier results in a SNR or MER threshold value for each MCS profile tier.

As shown in FIG. 7B, percentages of cable modems per tier depicted in a PDF map of MER values is divided in to four areas corresponding to the four profiles tiered based on the pre-defined percentage of cable modems, % CMB, % CML, % CMM, % CMH, that will be mapped to each MCS profile, base, low, medium, and high, respectively. Thus, the defined metric values (percentage of cable modems per profile) result in MER threshold values for each of remaining MCS profiles, the base, low, medium, and high profiles: $SNR_{min}$ is the threshold value for the base profile, $SNR_L$ is the resulting threshold value for the low profile, $SNR_M$ is the resulting threshold value for the medium profile, and $SNR_H$ is the resulting threshold value for the high profile. In embodiments, the $MER_{min}$ (the minimum reported MER value for the OFDM channel) is the threshold for creating the lowest order MCS profile (base profile) corresponding to $SNR_{min}$.

As shown by the examples in FIGS. 7A and 7B, the cable modems may be sorted according to their reported MER and translated in to one of the plurality of tiers. For example, the modems may be sorted by MER value based on an ascending MER value order or a descending value order and allocated based on the pre-defined percentages to a corresponding MCS profile to accommodate all cable modems using the OFDM channel.

As illustrated by the above examples, multiple approaches are contemplated for generating OFDM Modulation profiles from the raw data based on a metric. Encompassed in each of these techniques may be a manner for handling marginal network elements. A marginal network element is a network element in the plurality of network elements that is associated with two or more of the plurality of tiers. Referring back to FIG. 5, Line 514 represents a cable modem having MER measurements for each of the subcarriers 0-9. The cable modem represented by Line 514 is a marginal cable modem because the MER values "cross the line" between tiers based on the MCS MER threshold values used to initially group the cable modems. At a first frequency associated with subcarrier 0, the cable modem measurement is above the high tier MCS profile threshold line 514, indicating that the cable modem may belong to the high tier MCS profile. But, at a different frequency associated with subcarrier 1, the cable modem measurement falls below the high tier MCS profile threshold value, indicate that the cable modem may belong to the medium tier MCS profile. Thus, cable modems that that do not fit in to a single tier demonstrate a need to determine which tier to profile the cable modem.

Further examples of a marginal network is a network element that is associated with two or more of the plurality of tiers due to having at least one metric value for a first subcarrier that corresponds to one of the plurality of modulation tiers and at least one metric value for another subcarrier that corresponds to another one or more of the plurality of modulation tiers. For example, a marginal cable modem may have MER measurements that cross threshold lines between tiers, having MER measurements both above a threshold value and below, i.e., crossing in to two tiers. A cable modem may also be deemed a marginal cable modem if many of the MER values are close to a threshold boundary between two or more tiers without crossing the line.

Designating a marginal cable modem to a defined tier that is not the best across all subcarriers can create problems. Consider an example of a cable modem assigned to a base MCS profile tier. However, at a particular frequency, the cable modem may have an MER measurement associated with a different tier, such as the tier represented by the low profile. Choosing the low tier MCS profile for the cable modem may result in a failure for that cable modem on the subcarriers in the base MCS profile tier.

In embodiments, the manner for generating the OFDM profile may address marginal cable modems. As described above, a target percentage approach may be used to distribute network elements to the modulation tiers of the OFDM channel. The target percentage approach may inherently address the marginal CMs. In embodiments, a user, such as an MSO operator, a CMTS developer, or a cable modem, for example, may specify a target percentage of CMs to be placed in a particular tier of the MCS profile. Thus, marginal CMs may be moved according to the percentages so as to adhere to the target percentages. If, for example, a cable modem had most of its MER measurements in the low tier, but several MER measurements crossed in to the middle tier, the cable modem may remain in the low tier because the target percentage of cable modems in the middle tier has already been met. Conversely, if a target percentage in a middle tier had not been met, the cable modem(s) with the most crossover MER measurements may be selected for moving in to the middle tier in order to reach the target percentages for each tier, as illustrated by the example above for CM_ID=C.

Referring back to FIG. 6, CM_ID=C belongs to tier 1 despite the average MER for CM_ID=C being outside of the tier 1 range. The distribution scheme for the OFDM may be a CM count, where each tier is to have an equal number of cable modems allocated. If the distribution scheme required an equal number of cable modems designated to tier 1 and tier 2, CM_ID=C may have been moved in to tier 1 because it has more higher level MER values than CM_ID=H, which also has an average MER of 27. Most of the individual MER values shown for CM_ID=C fall in the tier 1 MER range. This is just one example of how to move cable modems in to tiers, as more are described below that may be used in alone or in combination with each other or the approaches already described.

In other embodiments, the OFDM profile may be overridden or enhanced by a predetermined scheme for marginal cable modems. The predetermined scheme for marginal cable modems comprises a scheme for allocating the marginal network element to a tier. Thus, the OFDM profile based on a distribution technique may be modified or overridden for marginal network elements based on the predetermined scheme for distributing marginal network elements. For example, even if the cable modem represented by line 514 would be designated to a tier based on one of the methods described, such as based on the average MER value or the minimum MER for the cable modem across all of the subcarriers, the marginal modem may be handled differently based on a predetermined scheme that makes up the OFDM profile. Thus, the OFDM profile may include the predetermined scheme for allocating marginal network elements to a tier in the plurality of modulation tiers, particularly where the distribution of cable modems in to tiers may not address how to handle the marginal network elements.

Referring again back to FIG. 6, CM_ID=C belongs to tier 1 despite the average MER for CM_ID=C being outside of the tier 1 range. Various predetermined schemes may have been defined that allocated CM_ID=C to tier 1. For example, a closest fit predetermined scheme may be defined in the OFDM profile. The predetermined scheme may be a closest fit scheme, wherein the marginal network element is allocated to a tier with the smallest difference between the network element metric value for each OFDM subcarrier and a metric value associated with each of the plurality of modulation tiers for each OFDM subcarrier. Thus, while the average MER for CM_ID=C corresponds to tier 2's metric value range of 23-27, the MER values for CM_ID=C are mostly in the tier 1 range. Thus, CM_ID=C, despite the allocation to tier 2 based on the distribution scheme in the OFDM profile, may be overridden by the predetermined scheme for handling marginal CMs.

In embodiments, the predetermined scheme is based on a primary tier, wherein the tiers are each defined by upper metric boundary values and lower metric boundary values, and the marginal network element is allocated to the tier in which the majority of the network element metric values for the plurality of subcarriers map.

In embodiments, the predetermined scheme is based on a lowest tier in which the marginal network element has a metric value. In embodiments, network elements with marginal MER readings are moved to a lower tiered network element subset. Thus, marginal network elements (e.g., cable modems with MER measurements that correspond to multiple tiers or have a relatively large number of MER measurements that are close to a tier boundary/boundaries) may be systematically moved to the lower tier group. Thus, for example, the cable modem represented by line 514 would be moved to the medium-tier MCS profile.

Similarly, in embodiments, the predetermined scheme is based on the highest tier in which the marginal network element has a metric value. It is recognized that moving any network element that may "cross the line" into a lower/lowest tier or a higher/highest to which the network element's MER measurements corresponds, as a default action, may result in an overall degradation to the network element's entire transmission profile due to the small number of marginal subcarriers. In embodiments, the MCS profile tiers are adjusted to accommodate marginal network elements. The profile defined for the plurality of modulation tiers in the OFDM channel may be defined with initial values and adjusted over time, i.e., dynamically adjusted. For example, the profile may be adjusted by adjusting each of the plurality of modulation tiers based on at least one of: improved SNR performance of at least one of the subcarriers, calculations based on FEC, or increasing the modulation order of a subcarrier.

The MCS profile tiers may be individually adjusted to accommodate subcarrier MER values for all network elements, including marginal network elements, in a network element subset. For example, in FIG. 5, the high tier threshold value represented by Line 508 may be adjusted lower to include subcarriers 1 and 2 if it is desirable that the cable modem represented by Line 514 remain in the high tier MCS profile group. The system may adjust the modulation profile of a tier so that all CMs in the tier can use all of the subcarriers in the tier without failure. Further, in embodiments, tiers are added and/or modified, allowing more granularity. For example, in FIG. 6, a tier between tiers 1 and 2 may be added. In embodiments, the system may adjust the MCS profile of a tier so that all CMs in the tier can use all subcarriers in the tier. In embodiments, modifying the tier threshold values results in a change to the initial assignment of CMs to each of the plurality of tiers.

In embodiments, settings for modulation tiers are adjusted over time. Some subcarriers have better signal to noise ratios than others. Profiles are not static, some vary widely, some are stable; ingress noise affects some carriers more than others, but things like thermal variations might affect all of them but not nearly as much as impulse noise. For example, thermal noise can be lowered by reducing the number of actives in the network or by replacing older actives with newer ones that have lower noise figures.

Further, metric values for each of the plurality of modulation tiers may be defined by initial values and be adjusted dynamically. The metric values for each of the plurality of modulation tiers are adjusted based on at least one of: improved SNR performance of at least one of the subcarriers, calculations based on FEC, or increasing the modulation order of a subcarrier. Adjusting profile levels over time may improve performance once initial MER measurements have been taken. By moving away from strict hierarchical profile settings (e.g., static profile subsets defined within a tier), the modulation settings for each individual subcarrier is continually optimized for maximum capacity, thereby improving the overall performance of the OFDM channel. Thus, the settings for the tier may be adjusted based on the optimized modulation settings.

In embodiments, adjustments are made to the MCS profiles by increasing the modulation order and relying on FEC to correct any increases in bit errors. For example, the system may make adjustments to the MCS profiles by increasing the modulation order in some subcarriers, for example, thereby decreasing the operating margin and relying on FEC to correct the slight increase in the number of errors in a small number of modems, while increasing overall throughput. Higher orders of modulation require lower noise levels in the channel so that the modulation error ratio (MER) is high enough to support the increased order of modulation. Thus, after the modulation profile is designated for a particular CM, taking the FEC in to account may provide some corrections to assist in determining which profile a CM belongs. This embodiment allows for some errors by allowing a larger modulation error to move some of the marginal CMs in to a tier, which may enable those modems to have better overall performance.

Initially sorting the cable modems based on SNR performance, and then improving the SNR performance over subcarriers that result in marginal cable modems, may address the distribution of the marginal CMs to the modulation tiers. For example, considering the CM_ID=C in FIG. 6, if the SNR performance over subcarrier 0 were improved, the MER measurement for CM_ID=C may increase, therefore moving it from the tier 2 range of 23-27 in to tier 1's range of 28-38, and thereby making the cable modem no longer a marginal network element.

In embodiments, the system may dynamically change which cable modems are designated to each tier. The system may need to adjust the groupings as MER measurements change, as cable modems are added to or removed from the OFDM channel, etc. MER values can change night and day, for example, which is why it is common practice to utilize the SNR margin to allow for such variations and not change modulation order. The SNR margin is very large in DOCSIS 3.0 so cable operators typically do not change the modulation settings. In DOCSIS3.1, the small subcarriers allow the system to tune the modulation settings by tiers and operate efficiently with less margin. It is impractical to expect the operators to intervene in real time to address drift in modulation performance, so automatic compensation schemes that allow modems to change tiers as the network performance drifts is a significant benefit.

The use of multiple modulation and coding scheme (MCS) profiles provides a manner of grouping cable modems based on the performance over the subcarriers in the channel, resulting in designating profile tiers to each network element. Instead of defining a modulation profile for each subcarrier (e.g., consider a scenario with 4000 or 8000 subcarriers and requiring the same number of modulation profiles), it may be ideal that each modem have one profile assigned for use across all subcarriers in the OFDM channel. The grouping and distribution scheme reduces the number of profiles to be managed, by creating profile tiers and only have a limited number of profiles to assign throughout the cable modem population.

In embodiments, the CMTS broadcasts the tiered profile information periodically on the PHY signaling channel. In embodiments, the profile information is changed only upon MSO action. In embodiments, the CMTS could propose the profiles to the MSO to be accepted as provided or modified by the MSO. For example, the MSO may modify each subcarrier group modulation QAM level before making a profile active.

As described, the disclosed concepts and algorithms may be processed by a component in the cable television network, such as in the CMTS equipment. Using the CMTS, the cable operator (or Multiple Service Operators—MSO) can exercise control over the cable modem's configuration. For example, the CM configuration may be changed to adjust for varying line conditions and customer service requirements. In embodiments, all DOCSIS CMTS equipment has SCM profiles, and the techniques disclosed define how the DCOSIS CMTS identifies the profiles and groups the CMs in to the profile tiers.

In embodiments, the various techniques for determining profiles may be offloaded to another device. For example, as described herein, an SNR measurement matrix may be offloaded to another device for offline processing.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

A computer-readable storage medium may have stored thereon instructions that, when executed, cause a processor to divide the OFDM channel in to a plurality of modulation tiers across the plurality of subcarriers based on a modulation level. Instructions further cause the processor to define a metric associated with a measurable characteristic of the network elements, wherein at least one metric value for the metric is associated with each of the plurality of modulation tiers, and collect measurements for a plurality of the network elements communicating over the OFDM channel, each measurement corresponding to one of the plurality of network elements and a respective one of the plurality of subcarriers. For each of the plurality of network elements, the instructions cause the processor to translate the measurements collected for the respective network element for comparison to the metric values associated with the plurality of tiers, and allocate each of the plurality of network elements to a tier in the plurality of modulation tiers based on the comparison of the measurements collected for the plurality of network elements to the metric values associated with the plurality of modulation tiers.

As described with respect to FIG. 1, a communication interface may connect the edge device 140 to the IP network 120 and HFC network 150. A bus is a communication medium that may connect a processor, e.g., CMTS processor, a data storage device, communication interface, DOCSIS external physical interface (DEPI), and memory (such as Random Access Memory (RAM), Dynamic RAM (DRAM), non-volatile computer memory, flash memory, or the like).

In embodiments the communication interface utilizes downstream channels (e.g., channels 5-8) to communicate with the HFC network 150. The DEPI may connect the edge device 140 to the CMTS 130. In embodiments, on the edge device 140 is an application-specific integrated circuit (ASIC).

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

We claim:

1. A method for identifying a plurality of modulation tiers for grouping network elements communicating over an orthogonal frequency division multiplexed (OFDM) channel having a plurality of subcarriers, the method comprising:

defining a metric associated with a measurable characteristic of the network elements;

collecting measurements associated with the measurable characteristic for a plurality of the network elements communicating over the OFDM channel, each measurement corresponding to at least one of the plurality of network elements and a respective one of the plurality of subcarriers, wherein the measurements collected for the plurality of network elements communicating over the OFDM channel includes:

receiving digitally modulated signals returned from the plurality of network elements; and calculating the measurements for each of the plurality of network elements based on downstream or upstream parameters by headend equipment that characterizes the digitally modulated signals returned from the plurality of network elements, wherein characterizing the digitally modulated signals returned from a network element to calculate the measurements comprises:

measuring an initial total power loading which is equal to total power of radio frequency (RF) energy present within a bandwidth of interest on an OFDM channel;

instructing a cable modem to transmit a first test signal on the OFDM channel at initial total power loading;

monitoring the first test signal at a headend of the OFDM channel; and measuring at the headend at least one of modulation error ratio (MER0), signal-to-noise ratio (SNR0), packet error rate (PER0), or bit error rate (BER0);

for each of the plurality of network elements, translating the measurements collected for the respective network element in to at least one network element metric value;

dividing the OFDM channel into a plurality of modulation tiers each based on a range of the network element metric values determined from the measurements collected for the plurality of network elements, wherein each modulation tier is associated with a modulation level;

for each of the plurality of network elements, comparing the respective at least one network element metric value to the range of metric values associated with each of the plurality of modulation tiers; and distributing each of the plurality of network elements to a modulation tier in the plurality of modulation tiers based on the comparison of the at least one network element metric value to the range of metric values associated with each of the plurality of modulation tiers.

2. The method of claim 1, further comprising generating the profile of the OFDM channel based on an identification of the plurality of modulation tiers and the metric values associated with each of the plurality of modulation tiers.

3. The method of claim 1, wherein the metric associated with a measurable characteristic of the network elements is a characteristic of at least one of a cable modem, a cable modem termination system (CMTS), or the OFDM channel.

4. The method of claim 1, wherein the measurable characteristic of the network elements is at least one of a modulation error rate, a signal-to-noise ratio, a packet error rate, a bit error rate, or a number of cable modems.

5. The method of claim 1, wherein the metric associated with the measurable characteristic of the network elements defined for each of the plurality of tiers includes at least one of:

a target of the measurable characteristic for a respective tier, a threshold of the measurable characteristic for each respective tier, an average of the measurable characteristic for a respective tier, a minimum of the measurable characteristic for a lowest tier, a maximum of the measurable characteristic for a highest tier, a statistical distribution of the measurable characteristic among the tiers, a percentage amount of the measurable characteristic for a respective tier, or an equal distribution of the measurable characteristic for each tier.

6. The method of claim 1, wherein the metric values associated with the metric defined for each of the plurality of modulation tiers includes at least one of a range of values, values calculated from the measurements for the plurality of network elements, user-defined values, cable operator-defined values, statistical approach values, a total number of cable modems divided by the number of tiers, or a percentage of the total number of cable modems.

7. The method of claim 1, wherein distributing each of the plurality of network elements to a modulation tier based on the comparison of measurement collected for the plurality of network elements to the metric values associated with the plurality of modulation tiers is a distribution based on at least one a cable mode (CM) count per tier, a target CM measurement per tier, a target modulation measurement per tier, a statistical measurement per tier, or defined for each tier based on a standard deviation curve.

8. The method of claim 1, wherein each of the plurality of modulation tiers has a threshold value of the measurable characteristic defined for each of the plurality of subcarriers.

9. The method of claim 8, wherein the profile further includes a predetermined scheme for allocating marginal network elements to a tier in the plurality of modulation tiers.

10. The method of claim 1, wherein a marginal network element is a network element in the plurality of network elements that is associated with two or more of the plurality of tiers.

11. The method of claim 10, wherein the marginal network element is associated with two or more of the plurality of tiers due to having at least one first metric value for a first subcarrier that corresponds to one of the plurality of modulation tiers and at least one second metric value for another subcarrier that corresponds to another one or more of the plurality of modulation tiers.

12. The method of claim 10, wherein the allocation of a marginal network element to a tier in the plurality of modulation tiers is based on a predetermined scheme.

13. The method of claim 12, wherein the predetermined scheme comprises a scheme for allocating the marginal network element to a tier based on at least one of:

a closest fit, wherein the marginal network element is allocated to a tier with the smallest difference between the network element metric value for each OFDM subcarrier and a metric value associated with each of the plurality of modulation tiers for each OFDM subcarrier;

a primary tier, wherein the tiers are each defined by upper metric boundary values and lower metric boundary values, and the marginal network element is allocated to the tier in which the majority of the network element metric values for the plurality of subcarriers map;

the lowest tier in which the marginal network element has a metric value; or the highest tier in which the marginal network element has a metric value.

14. The method of claim 1, wherein the network element is at least one of a cable modem, set top box, television equipped with set top box, data over cable service interface specification (DOCSIS) terminal device, or a media terminal adapter (MTA).

15. The method of claim 1, wherein profile defined for the plurality of modulation tiers in the OFDM channel are defined with initial values and are dynamically adjustable.

16. The method of claim 15, wherein the profile is adjusted by adjusting each of the plurality of modulation tiers based on at least one of: improved signal-to-noise ratio (SNR) performance of at least one of the subcarriers, calculations based on forward error correction (FEC), or increasing the modulation order of a subcarrier.

17. A cable television network complying at least in part with a Data Over Cable Service Interface Specification (DOCSIS) protocol, the cable television network comprising:

a plurality of cable modems;

a cable modem termination system (CMTS) in communication with the plurality of cable modems, said CMTS having a receiver configured to monitor the test signals and a processor configured to record measurements;

one or more orthogonal frequency division multiplexed (OFDM) channels, the CMTS communicating with the plurality of cable modems over the one or more orthogonal frequency division multiplexed (OFDM) channels, the network configured to define a metric associated with a measurable characteristic of the network elements for at least one OFDM channel;

the cable modem termination system (CMTS) configured to:

remotely instruct a network element to transmit test signals at a pre-determined power level on a return path of a test channel;

collect measurements associated with the measurable characteristic for a plurality of the network elements communicating over the OFDM channel, each measurement corresponding to at least one of the plurality of network elements and a respective one of the plurality of subcarriers, wherein the measurements collected for the plurality of network elements communicating over the OFDM channel includes:

receiving digitally modulated signals returned from the plurality of network elements; and calculating the measurements for each of the plurality of network elements based on downstream or upstream parameters by headend equipment that characterizes the digitally modulated signals returned from the plurality of network elements, wherein characterizing the digitally modulated signals returned from a network element to calculate the measurements comprises:

measuring an initial total power loading which is equal to total power of radio frequency (RF) energy present within a bandwidth of interest on an OFDM channel;

instructing a cable modem to transmit a first test signal on the OFDM channel at initial total power loading;

monitoring the first test signal at a headend of the OFDM channel; and measuring at the headend at least one of modulation error ratio (MER0), signal-to-noise ratio (SNR0), packet error rate (PER0), or bit error rate (BER0);

for each of the plurality of network elements, translate the measurements collected for the respective network element in to at least one network element metric value;

divide the at least one OFDM channel into a plurality of modulation tiers each based on a range of the network element metric values determined from the measurements collected for the plurality of network elements, wherein each modulation tier is associated with a modulation level;

for each of the plurality of network elements, compare the respective at least one network element metric value to the range of metric values associated with each of the plurality of modulation tiers; and allocate each of the plurality of network elements to a tier in the plurality of modulation tiers based on the comparison of the at least one network element metric value to the range of metric values associated with each of the plurality of modulation tiers.

18. A non-transitory computer-readable storage medium having stored thereon instructions that, when executed, cause a processor to:

define a metric associated with a measurable characteristic of the network elements for at least one OFDM channel;

collect measurements associated with the measurable characteristic for a plurality of the network elements communicating over the OFDM channel, each measurement corresponding to at least one of the plurality of network elements and a respective one of the plurality of subcarriers, wherein the measurements collected for the plurality of network elements communicating over the OFDM channel includes:

receiving digitally modulated signals returned from the plurality of network elements; and calculating the measurements for each of the plurality of network elements based on downstream or upstream parameters by headend equipment that characterizes the digitally modulated signals returned from the plurality of network elements, wherein characterizing the digitally modulated signals returned from a network element to calculate the measurements comprises:

measuring an initial total power loading which is equal to total power of radio frequency (RF) energy present within a bandwidth of interest on an OFDM channel;

instructing a cable modem to transmit a first test signal on the OFDM channel at initial total power loading;

monitoring the first test signal at a headend of the OFDM channel; and measuring at the headend at least one of modulation error ratio (MER0), signal-to-noise ratio (SNR0), packet error rate (PER0), or bit error rate (BER0);

for each of the plurality of network elements, translate the measurements collected for the respective network element in to at least one network element metric value divide the at least one OFDM channel into a plurality of modulation tiers each based on a range of the network element metric values determined from the measurements collected for the plurality of network elements, wherein each modulation tier is associated with a modulation level;

for each of the plurality of network elements, compare the respective at least one network element metric value to the range of metric values associated with each of the plurality of modulation tiers; and allocate each of the plurality of network elements to a tier in the plurality of modulation tiers based on the comparison of the at least one network element metric value to the range of metric values associated with each of the plurality of modulation tiers.

* * * * *